(12) United States Patent
Smith et al.

(10) Patent No.: US 6,535,373 B1
(45) Date of Patent: Mar. 18, 2003

(54) NON-AQUEOUS ELECTROLYTE

(75) Inventors: W. Novis Smith, Philadelphia, PA (US); Joel McCloskey, Philadelphia, PA (US)

(73) Assignee: Lithdyne International, Anaheim, CA (US)

( * ) Notice: Subject to any disclaimer, the term of this patent is extended or adjusted under 35 U.S.C. 154(b) by 0 days.

(21) Appl. No.: 10/170,559

(22) Filed: Jun. 12, 2002

(51) Int. Cl.$^7$ .................................................. H01M 6/04
(52) U.S. Cl. ........................ 361/504; 361/507; 361/508; 361/503; 361/502; 252/62.2
(58) Field of Search .................................. 361/504, 503, 361/502, 512, 518, 523, 528, 505, 506, 527; 252/62.2

(56) References Cited

U.S. PATENT DOCUMENTS 5,418,682 A * 5/1995 Warren, Jr. et al.
5,457,599 A * 10/1995 Kuwae et al.
5,965,054 A * 10/1999 McEwen et al.
6,356,433 B1 * 3/2002 Shi et al.

* cited by examiner

Primary Examiner—Anthony Dinkins
Assistant Examiner—Nguyen Ha
(74) Attorney, Agent, or Firm—John Lezdey

(57) ABSTRACT

A non-aqueous electrolyte for use in batteries and electrical capacitors for use at low temperatures. The electrolyte consists of at least two quaternary ammonium salts in a nitrile solvent.

12 Claims, 1 Drawing Sheet

NON-AQUEOUS ELECTROLYTE

FIELD OF THE INVENTION

The present invention relates to electrolytes which are useful for various electrochemical elements. More particularly, there is provided a mixture of quaternary ammonium salts which are useful at low temperatures, especially for use in double layer capacitors in combination with a nitrile solvent.

BACKGROUND OF THE INVENTION

The basic components of electrical capacitors include conductive electrodes connected to an electric power supply and a dielectric material separating the electrodes. Electrolytic capacitors and electrochemical double layer capacitors also have an electrolyte. In an electrolytic capacitor, the dielectric is provided by an oxide layer formed on a metal foil and the electrolyte provides electrical contact to the opposite electrode. The inherently high resistance of electrolytic capacitors is generally mitigated by rolling a large sheet of the material into a roll. In an electrochemical double layer capacitor, the dielectric is provided by the electrolytic. In this type of capacitor, the resistance of the electrolyte is a significant factor in the total device resistance. In capacitors that use electrolytes, the electrolyte also has a major influence on the temperature performance of the capacitor.

Electrochemical double layer capacitors, including supercapacitors, typically comprise electrodes, electrical contacts to a power supply, separators for electrode and/or cells, an electrolyte and environmental seals. As mentioned above, a key component of electrolytic and electrochemical double layer capacitors is the electrolyte, which typically comprises a combination of a salt and a solvent. Desirable electrolytes are typically liquid with low viscosity, low density, and high conductivity over a range of ambient temperature conditions. They should also be commercially inexpensive, chemically and electrochemically stable, and compatible with carbon. Aqueous electrolyte systems have been used extensively, but certain organic liquid systems are less prone to form gas and can be more effective in providing higher energy densities over a wider usable range of temperature and potential. In addition, these organic electrolytes permit higher voltage and therefore results higher capacity in the capacitors. A need exists for improved electrolyte systems that provide optimum capacitance for capacitors to achieve high power density, a wide temperature range, and a long lifetime without memory effects.

The key requirements for both non-aqueous batteries and capacitors are low temperature performance, electrochemical stability, and lower costs.

European patent application EPO 0984471 A2 which is herein incorporated by reference, discloses a method for producing electric double layer capacitors which contains tetrafluoroborate and hexafluorophosphate of imadazolium derivatives, which can be used in the present invention. However, acetontrile or similar solvents are not utilized.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. No. 5,965,054 to McEwen et al, which is herein incorporated by reference discloses non-aqueous electrolytes for electrical storage devices utilizing salts consisting of alkyl substituted, cyclic delocalized aromatic cations and their perfluoro derivatives with alkyl carbonate solvents.

Of the quaternary ammonium tetrafluoroborate salts, it has been found that tetraethylammonium tetrafluoroborate (TEATFB) is the most advantageous because of its stability and conductivity. However, a major disadvantage is that its solubility is limited and it starts to freeze out at about $-30°$ C. from solutions, thereby lowering low temperature performance.

SUMMARY OF THE INVENTION

The present invention comprises an improvement in non-aqueous electrolytes for use in non-aqueous batteries and double layer capacitors as the result of using a mixture of conductive quaternary ammonium tetrafluoroborate salts in a nitrile solvent. More particularly there is provided a composition which at a concentration of about 0.6 to 2.5M has a conductivity in the range of about 50 to 58 mS/cm at 20° C. and can be cooled to at least 40° C.

It has been found to be advantageous that one of the quaternaly ammonium tetrafluoroborate salts is tetraethylammonium tetrafluoroborate, or methyltriethylammonium tetrafluoroborate also, the use of acetonitrile as the solvent.

It is therefore an object of the invention to provide a non-aqueous electrolyte comprising mixtures of conductive quaternary ammonium tetrafluoroborate salts which can be used in batteries and double layer capcitors.

It is a further object of the invention to provide a non-aqueous electrolyte capable of performance at low temperatures.

It is a still further object of the invention to provide an improved double layer capacitor.

Other features and advantages of the invention will be apparent from the following description of the preferred embodiments thereof and from the claims, taken in conjunction with the following drawing.

BRIEF DESCRIPTION OF THE PREFERRED EMBODIMENTS

Figure 1:
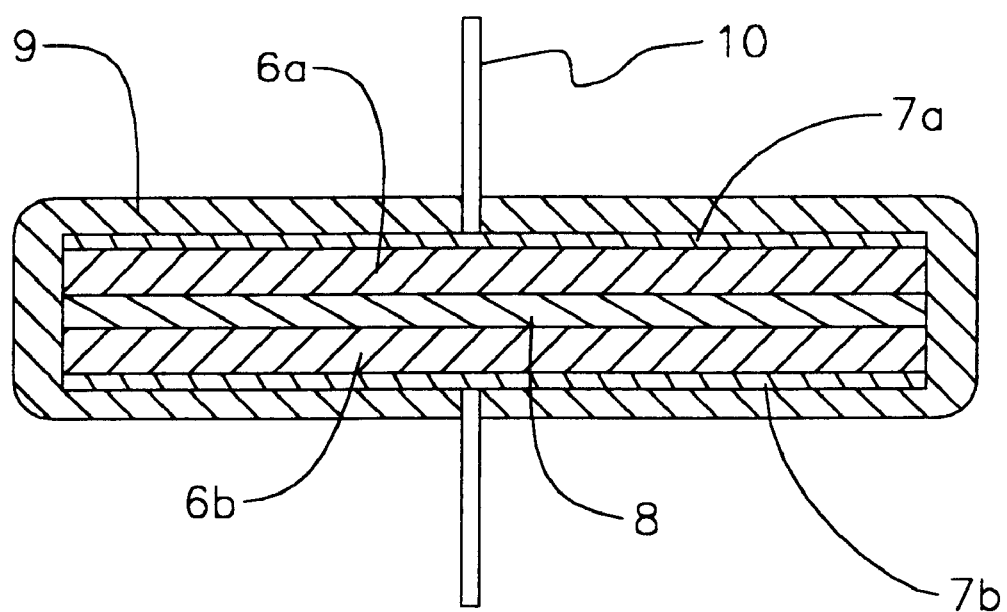
FIG. 1 is an example of one type of double layer capacitor which can be used with the non-aqueous electrolyte of the invention.

FIG. 1 shows a schematic cross section of one example of the electric double layer of the present invention. This example shows a thin-type cell having a size of 1 cm×1 cm and a thickness of about 0.5 mm, where 7a and 7b are collector bodies, a pair of polarizable electrodes 6a and 6b are disposed inside of the collector bodies, and an electrolyte 8 is disposed therebetween. The numeral 9 is an insulating resin sealant and 10 is a lead wire.

The material used for the collector body 7 is an electronically conductive and electrochemically anticorrosive, and preferably has a specific surface area as large as possible. Examples thereof include various metals and a sintered body thereof electronic conductive polymers and carbon sheet.

The polarizable electrode 6 may be an electrode comprising a polarizable material such as a carbon material usually used in an electric double layer capacitor. The carbon material as the polarizable material is not particularly restricted as long as the specific surface area is large, however, carbon materials having a larger specific surface area are preferred because the electric double layer can have a large capacity. Examples thereof include carbon blacks such as furnace black, thermal black (including acetylene black) and channel black, activated carbons such as coconut husk carbon, natural graphite, artificial graphite, so-called pyrolytic graphite obtained by the vapor phase process, polyacene, $C_{60}$ and $C_{70}$.

A key component of electrolytic and electrochemical double layer capacitors of the invention is the electrolyte 14, which generally comprises a combination of quaternary ammonium salts and a solvent. The electrolyte 14 is chemically and electrochemically stable, compatible with carbon, commercially inexpensive, relatively low viscosity in a range of ambient temperature conditions, and operable at temperatures less than −40° C. Aqueous electrolyte systems are in wide-spread use, but certain organic liquid systems can be more effective in providing a greater usable range of electric potential energy density, and operating temperature. The dielectric constant of the solvent is also important in achieving optimum power and utilization of the capacitance because it affects both the double layer capacitance and the electrolytic conductivity. The improved capacitors of the present invention use specific organic electrolytes to provide optimum capacitance, high power density (on the order of ten kilowatts per kilogram), high energy density (on the order of ten watt-hours per kilogram, or ten watt-hours per liter), and long lifetime without memory effects when used with a nitrile solvent.

Among organic electrochemical solvents, nitriles such as acetonitrile, or "ACN" ($CH_3CN$), are especially useful because they are generally nonreactive and difficult to oxidize or reduce electrochemically. Acetonitrile has one of the widest available ranges of electric potential of any organic solvent (in excess of 4 V with a platinum electrode and the electrolyte salts of the invention).

Other nitriles that might be considered for electrochemistry (such as the mononitriles, phenylacetonitrile, isobutyronitrile, benzonitrile, and acrylonitole, for example) generally have even lower dielectric constants and lower ranges of electric potential stability compared with ACN. Dinitrile systems, such as succinonitrile, or "SN" ($NCCH_2CH_2CN$), and glutaronitrile, or "GN" ($NCCH_2CH_2CH_2CN$), have high boiling points (i.e., greater than about 265° C.), but are less well known. SN has a relatively high dielectric constant in the liquid state, but it is a solid at room temperature (m.p.=54°–56° C.). GN, however, is a liquid at room temperature (m.p.=−29° C.).

Other solvents suitable for use as electrolytes in the present invention include dinitriles such as 2-methylglutaronitrile and mixtures of nitriles and dnitriles. Embodiments of the invention may include various mixtures of the described electrolytes to cover a wide range of operating temperatures from about −60° C. to about 150° C.

Accordingly, the invention provides the use as the electroyte salts a combination of at least two tetralkylammonium salts wherein one of the salts is tetraethylammonium tetrafluoroborate and the other is methyltriethylammonium tetrafluoroborate:

In addition to the above-mentioned salts, there may be included the salt of a imidazolium compound of the formula:

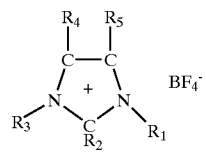

wherein R, $R_2$, $R_3$, $R_4$ and $R_5$ are selected from the group consisting of alkyl having 1–5 carbon atoms and is a member of the group consisting of tetrafluoroborate, triflate and hexafluorophosphate.

A preferred imidazolium salt is 1-ethyl-3-methylimindazolium tetrafluoroborate.

The one disadvantage of tetraethylammnonium tetrafluoroborate is that its solubility becomes limited and it starts freezing out at about −30° C. thereby diminishing low temperature performance. It has been found that the methyltriethylammonium tetrafluoroborate (MTEATFB) has higher solubility at these low temperatures and can be cooled as low as −40° C. without precipitating out. MTEATFB has slightly lower conductivity at room temperature (4%) at the same molar concentration compared to the TEATFB.

It has been found that mires of these two compounds in acetronitrile exhibit the same conductivity as the pure TEATFB at the same overall molar concentration, i.e., 0.5 MTEATFB plus 0.5 MTEATFB equal the same conductivity as 1.0 MTEATFB within about 2% at 20° C. At the same time the low temperature performance of the electrolyte containing the mixture of the two salts is essentially the same as the pure electrolyte containing the two salts down to at least −40° C. In other words the mix of the two salts even though they both dissolved are enhanced slightly in conductivities over the expected additive value of the conductivities at low temperatures.

This enhancement is not restricted to just mixtures of these two salts but other highly conductive salts such as imidazolium salts, preferably 1-ethyl-3-methylimidazolium tetrafluoroborate (EMITFB) a known ionic liquid. Solutions of this compound in acetronitrile at 1 M have a conductivity of 50 mS/cm at room temperature while solutions at 2M are about 59 S/cm at room temperature. Although, it is a more expensive compound than MTEATFB and TEATFB limited amounts of it with MTEATFB and TEATFB achieves the maximum conductivity both at room temperature and below −30° C. Therefore mixtures of EMITFB in acetonitrile can be advantageous. This is especially true at low temperatures. This effect could be achieved with imidazolium salt concentrations lower than 0.5M.

Therefore mixtures of highly conductive quaternary ammonium and related imidazolium salts, particularly tetrafluoroborates, have synergistic effect on their solubilities and conductivities at low temperatures when dissolved in higher dielectric solvents.

As shown in Table 1 with a mixture of TEATFB and MTEATFB, the conductivity of the mixture is similar at high temperatures as the pure quaternary ammonium salts and enhanced slightly at the lower temperature of the expective additive value. The improvement occurs at a salt concentration between 0.6 and 1.5M.

TABLE 1

Conductivity and Freezing Points of Mixed Tetrafluoroborate Electrolytes 1 Molar in Acetonitrile
mS/cm

|  | ° C. | | | Freezing |
| --- | --- | --- | --- | --- |
|  | 20 | −20 | −30 | Point ° C. |
| 1 M Salt Composition | | | | |
| 1.0 M TEATFB | 52.0 | 31.7 | 27.1 | −32 |
| 0.5 M TEATFB 0.5 M MTFATFB | 51.9 | 31.7 | 26.1 | <−40 |
| 1.0 M MTEATFB | 50.3 | 31.3 | 26.5 | <−40 |
| 1.0 M EMITFB | 50.2 | 29.0 | 24.6 | <−40 |

TABLE 1-continued

Conductivity and Freezing Points of Mixed Tetrafluoroborate Electrolytes
1 Molar in Acetonitrile
mS/cm

| | °C. | | | Freezing Point °C. |
|---|---|---|---|---|
| | 20 | −20 | −30 | |
| 0.4 M EMITFB<br>0.6 M TEATFB | 51.7 | 32.0 | 27.0 | <−40 |
| 0.4 M EMITFB<br>0.3 M TEATFB<br>0.3 M MTEATFB | 51.4 | 32.2 | 27.2 | <−40 |
| 3 M MTEATFB<br>3 M TEATFB<br>4 M TBATFB<br>2 M Salt Composition | ppt. | | 32.2 | |
| 2.0 M MTEATFB | 56.2 | | 28.0 | <−40 |
| 1.5 M MTEATFB<br>0.5 M EMITFB | 58.1 | | 29.6 | <−40 |
| 1.0 M MTEATFB<br>1.0 M TEATFB | 56.1 | | ppt out at −15 | |

TEATFB tetraethylammonium tetrafluoroborate
MTEATFB methyltriethylammonium tetrafluoroborate
EMITFB 1-ethyl-3-methylimidazolium tetrafluoroborate While the present invention has been described in conjunction with a preferred embodiment, one of ordinary skill, after reading the foregoing specifications, will be able to effect various changes, substitutions of equivalents, and other alterations to the compositions and methods set forth herein. It is therefore intended that the protection granted by the definitions contained in the appended claims and equivalents thereof.

What is claimed is:

1. In a non-aqueous electrolyte for an electrical storage device the improvement which comprises that said electrolyte contains a nitrile solvent and the combination of an imidazolium salt of the formula:

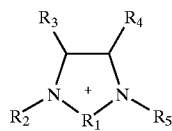

Wherein R, R2, R3, R4, and R5 are alkyl groups having 1–3 carbon atoms and X is a member of the group consisting of tetrafluoroborate, triflate, and hexafluorophosphate hexafluoroarsenate and at least two tetraalkylammonium salts in a nitrile solvent in a combined molar concentration of about 0.6 to 2.5M, a conductivity in the range of about 50 to 58 mS/cm at 20° C. and can be cooled to at least −40° C. without precipitation, said tetraalkylammonium salts comprising tetraethylammonium tetrafluoroborate and methyltriethylammonium tetrafluoroborate.

2. The electrolyte of claim 1 wherein said nitrite solvent is selected from the group consisting of acetonitrile, propionitrile, succinonitrile, glutaronitrile, and 2-methylglutaronitrile.

3. The electrolyte of claim 2 wherein said solvent is acetonitrile.

4. The electrolyte of claim 1 wherein said tetraalkylimidazolium tetrafluoroborate is 1-ethyl-3-methylimidazolium tetrafluoroborate.

5. The electrolyte of claim 1 comprising an equimolar mixture of tetraethylammonium tetrafluoroborate, and methyltriethylammonium, and a dialkimadazolium tetrafluoroborate.

6. In a double layer capacitor having a non-aqueous electrolyte the improvement wherein the electrolyte consists of the electrolyte of claim 1.

7. In a double layer capacitor having a non-aqueous electrolyte the improvement wherein the electrolyte consists of the electrolyte of claim 3.

8. In a double layer capacitor having a non-aqueous electrolyte the improvement wherein the electrolyte consists of the electrolyte of claim 4.

9. In a double layer capacitor having a non-aqueous-electrolyte the improvement wherein the electrolyte consists of the electrolyte of claim 5.

10. In a double layer capacitor having a non-aqueous electrolyte the improvement wherein the electrolyte consists of the electrolyte of claim 6.

11. In a battery having a non-aqueous electrolyte the improvement wherein the electrolyte consists of the electrolyte of claim 1.

12. In a non-aqueous electrolyte for an electrical storage device in which the electrolyte contains a nitrile solvent and an electrolyte tetraalkylammonium salt, the improvement which comprises a synergistic effective amount to effect conductivity for a low temperature of an imidazolium salt of the formula:

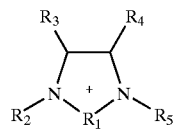

wherein R, R2, R3, R4, and R5 are alkyl groups having 1–3 carbon atoms and X is a member of the group consisting of tetrafluoroborate, triflate, and hexafluorophosphate hexafluoroarsenate.

* * * * *